March 30, 1965   O. A. WURTENBERG ETAL   3,175,775
CONTROL APPARATUS FOR ADVANCING WEB OF FILTER
MEDIUM THROUGH A FILTERING ZONE
Filed July 24, 1963
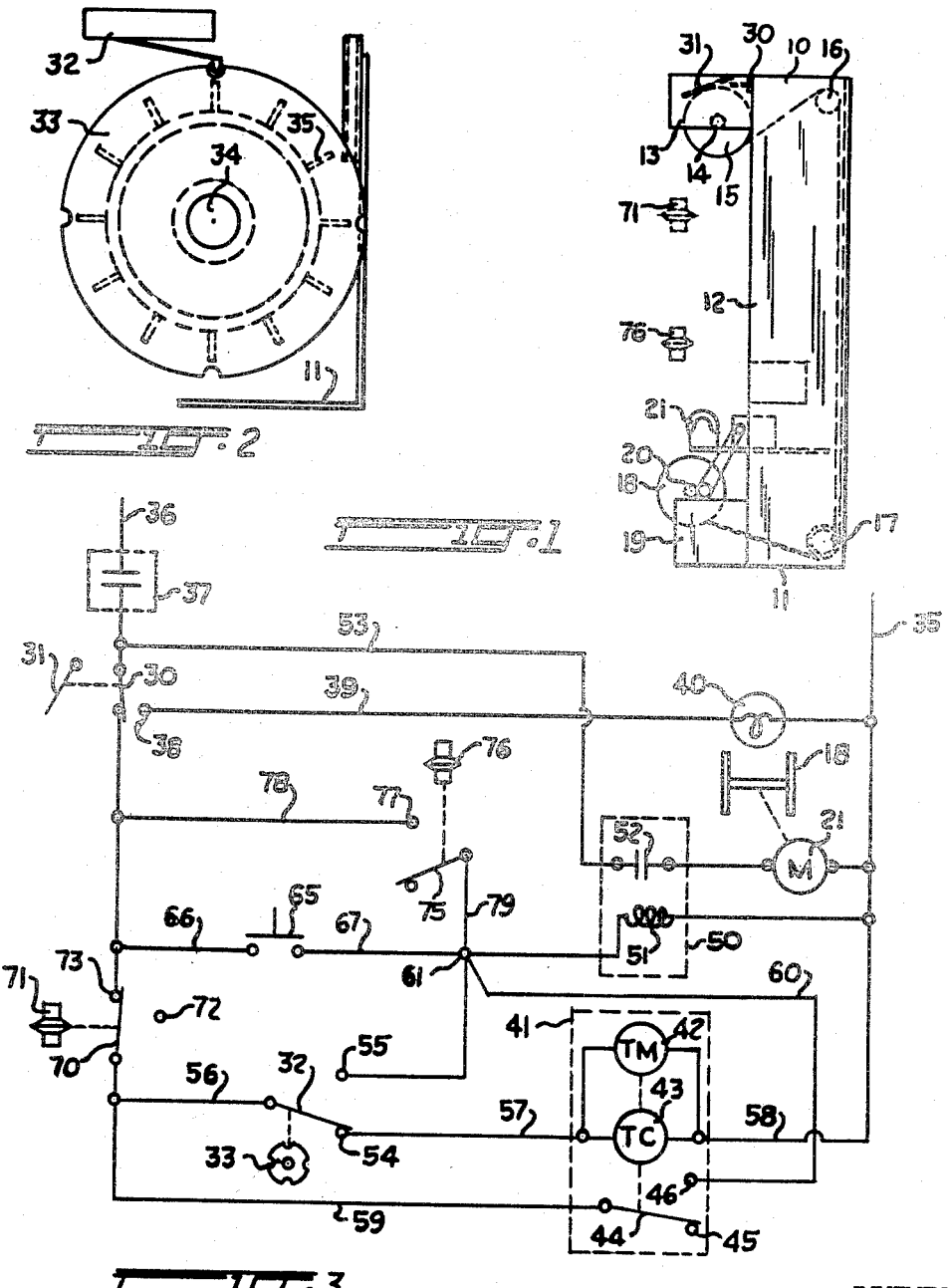
INVENTORS
OSCAR A. WURTENBERG
JAMES E. WOOLDRIDGE
BY   W. E. Sherwood
ATTORNEY

United States Patent Office 3,175,775
Patented Mar. 30, 1965

3,175,775
CONTROL APPARATUS FOR ADVANCING WEB OF FILTER MEDIUM THROUGH A FILTERING ZONE
Oscar A. Wurtenberg and James E. Wooldridge, Louisville, Ky., assignors to Continental Air Filters, Inc., Louisville, Ky., a corporation of Delaware
Filed July 24, 1963, Ser. No. 297,317
5 Claims. (Cl. 242—55)

This invention relates to a simplified and improved control apparatus for advancing an elongated web of filter medium through a filtering zone, and more particularly, to a control system mutually employing a single timer and a metering means responsive to linear advance of the web.

In the conventional renewable roll-away type of air and gas filter a supply roll of filter medium is unwound as needed to form a web extending across the filtering zone, the spent medium upon leaving that zone being rewound upon another roll. Many proposals have been made as to the means for advancing fresh filter medium into the filtering zone and for removing spent medium therefrom in a manner resulting in the most efficient employment of that medium, but most of those proposals have been attended by inherent limitations adding to complexity and cost of the apparatus. When such filters are operated automatically a timing mechanism is employed. In general, such mechanisms have comprised a pair of timers in cascade fashion, or a single timer having constructional features which significantly limit the choice of timing intervals during which the web may be advanced in uniform increments of web length.

Since the most efficient usage of the web is related to the filtering load being imposed thereon, it is important that the timer be capable of adjustment for a selected timing interval for, as will be understood, the filtering load may vary from place to place and from time to time at a given place. In certain timers, this adjustability is provided by keeping in stock a series of interchangeable gear racks the chosen one of which will be installed in the timer when a different time interval is needed. In other timers, a number of contact tabs are employed in pairs, one of which serves to start the timer, and the other to stop the timer. However, this type of timer is usually found to have a significantly small number of possible settings.

Moreover, in conventional filters employing an interchangeable web-metering means in conjunction with one or more timers, a variety of such metering means have to be stocked in order to have available at all times the metering means which, in conjunction with the timing operation, will produce the most efficient usage of the filter medium. It is limitations of the nature above mentioned which it is a purpose of our invention to overcome.

An object of the present invention is to provide a control system for automatically operating an air filter in a manner employing a web of filter medium in a more efficient way than found in conventional filters.

Another object is to provide a simplified control system for automatically operating an air filter at selected timing intervals and wherein the advancement of a web of filter medium comprises a series of increments of web material each having the same length.

Another object is to provide a simplified control system for automatically operating an air filter and wherein a single web-metering means responsive to linear advance of a web of filter medium is employed in conjunction with a single timer having available a wide range of choice of timing intervals.

Other objects and advantages will become more apparent as the description proceeds and when considered in conjunction with the accompanying drawings in which:

FIG. 1 is a partly diagrammatic side elevation view of an air filter with which the present invention may be employed.

FIG. 2 is a detail view of a metering means suitable for use with the present invention, and FIG. 3 is a wiring diagram illustrating the presently preferred embodiment of a control system employing the principles of the invention.

Referring first to FIG. 1, a suitable filter structure into which our invention may be incorporated preferably is of the type disclosed in U.S. Patent 2,848,064, assigned to the same assignee as the present invention. Such a filter includes a generally rectangular frame having a top 10, bottom 11, and side walls, one of which is shown at 12. At the top of the frame an enclosure having side walls, one of which is seen at 13, is arranged. These walls provide bearings upon which the shaft 14 of a roll 15 of fresh filter medium in the form of a convolutely wound web is mounted. When the web is advanced as a curtain through the filtering zone, it progressively leaves roll 15, passes over a guide idler roller 16, and after passing over the splined idler 17 is then rewound in the form of a roll 18 of spent material. An enclosure at the bottom of the frame, having side walls, one of which is shown at 19, provide bearings for mounting the shaft 20 of the rewind roll, this shaft being driven in any suitable manner by an electric motor 21. The present invention relates to a simplified and improved control of the operation of the motor 21.

A conventional run-out switch 30 which conveniently may be actuated by a plate 31 bearing upon the surface of the supply roll and arranged to actuate the switch 30 when the exhaustion of the filter medium supply is iminent, is provided. Also, as best shown in FIG. 2, a metering switch 32 (herein for simplicity called a first switch) which is actuated in dependence upon the linear advance of the web, likewise is provided. A convenient means for actuating switch 32 may take the form of a cam 33 attached to a shaft 34 on splined idler 17, the shaft 34 being mounted in the walls of the filter frame adjacent the lower ends of the same. Attached to the shaft 34 in the manner disclosed in the aforementioned patent is a series of angularly spaced splines 35 adapted to engage with the web and to be moved angularly as the web is advanced linearly. Other arrangements serving the same purpose may, of course, be employed without departing from the scope or intent of the present invention. Cam 33 includes equally spaced peripheral recesses into which the cam follower may fall in order to actuate the switch 32 following a predetermined amount of angular travel of the cam, and between these recesses peripheral cam lobes of equal length are provided with the result that equal increments of web length are advanced through the filtering zone each time the switch 32 is operated, as later to be described. As an example, in many usages increments of web advance in the order of one inch are sufficient.

Passing now to FIG. 3, the control circuit of the invention includes an electrical return line 35 connected to ground or to neutral and a supply line 36 in which a conventional fan interlock and fused disconnect switch 37 is arranged. The run-out switch 30 is located in line 36 and is movable between a closed position as when a supply of medium is present on roll 15, and an open position, as when the supply on that roll approaches exhaustion. In its open position switch 30 contacts terminal 38 and through conductor 39 establishes a circuit through warning lamp 40.

The invention employs a self-resetting timer 41 preferably of the 24-hour time range type, although timers with longer or shorter time ranges may be used when desired; and as a feature, the restarting of this timer, after it has reset itself, is delayed until switch 32 re-establishes the circuit to the timer motor. By way of illustration and not of limitation, this timer may comprise the commercially available Haydon Reset Acrotimer Series BR. Such a timer comprises a timer motor 42 in parallel with a timer clutch coil 43, which coil when energized opposes a spring tending to move a single-throw double-pole switch 44 (herein for simplicity called a second switch) from a normal first position in contact with abutment 45 to a second position in contact with terminal 46. The timer possesses the advantage of being capable of operating with substantially any selected time setting between zero and 1440 minutes (when a 24-hour timer is used) and without the necessity of maintaining a stock of gear racks. With the time range flexibility thus provided, the necessity for having on hand more than one cam 33 for the splined idler is eliminated. Concomitantly, the need for two timers in cascade is avoided and yet the assurance that the web will advance a uniform distance each time the motor 21 is energized through the timer is still retained.

For the purpose of energizing motor 21, a conventional RBM Type 84 relay shown at 50 is employed, the coil 51 of which closes relay switch 52 whenever that coil is energized. Upon closing of relay switch 52 a circuit is made through conductor 53 to motor 21 and thence to return line 35. As a significant feature contributing to simplicity and reliability, the single timer 41 is in turn made dependent for its starting impulse upon the preceding behavior of the switch 32 which is governed by cam 33. Switch 32 is movable between a normal first position in contact with terminal 54 (which is occupied when the web is at rest) and a second position in contact with terminal 55 (which is occupied when the web is moving).

With the foregoing description in mind, the advantages of the invention will be noted from the following operation. Timer 41 being set for the desired time interval and the web having come to rest from its previous movement, a circuit is made from line 36 through conductor 56, first switch 32, terminal 54, conductor 57, timer motor 42 and timer clutch coil 43 in parallel, and conductor 58 to return line 35. Energization of clutch coil 43 holds the second switch against abutment 45 in opposition to the spring of the clutch and this switch position is maintained until the timer motor 42 ends its timing cycle. When this event occurs, the spring is released causing the second switch 44 to move into contact with terminal 46 whereupon a circuit is made from line 36, conductor 59, switch 44, terminal 46, conductor 60, terminal 61, relay coil 51, and thence to return line 35. As this occurs, the relay switch 52 closes and motor 21 begins to turn thus driving the rewind roll shaft 20 and causing the web to advance. Movement of the web causes cam 33 to turn and to close the first switch 32 upon terminal 55 thus establishing an alternate circuit to relay coil 51 and maintaining the energization of motor 21. Simultaneously with the making of this alternate circuit the circuit to timer motor 42 and timer clutch coil 43 is broken and the timer then automatically resets itself in preparation for the next timing cycle. Motor 21 continues to turn thus advancing the web until the cam brings its next peripheral recess under the cam follower at which time the first switch 32 moves from terminal 55 to terminal 54. As this occurs, the relay coil 51 is de-energized, motor 21 comes to rest, and the circuit to timer motor 42 and timer clutch coil 43 is re-established thus beginning the next timing cycle.

In the event that the filtering load should change, the operator merely adjusts the reset timer 41 to a shorter or longer time cycle as needed, and the above described operation thereafter is followed with the new time intervals but with no change in the amount of linear movement of web advanced each time the timer operates. Having thus described the basic features of our improved control system it will be noted from FIG. 3 that supplementary features of control may also be employed without requiring modification of the basic system. For example, a normally open manual push button switch 65 is provided for emergency use or for use in adjusting the filter after replenishment of a new supply roll of medium. Closing of switch 65 makes a circuit from line 36 through conductors 66 and 67, terminal 61, relay coil 51 and return line 35 and this circuit drives motor 21 continuously so long as switch 65 is held closed.

A conventional media saver switch 70 optionally is interposed in line 36 between the described circuits for the respective manual switch 65 and the first switch 32. This media saver switch is under the influence of a conventional pressure responsive device 71 (FIG. 1) and normally remains in open position against abutment 72 so long as a selected pressure differential, for example, about 0.3 inch water pressure, exists between the upstream and downstream sides of the filter curtain. Such a condition indicates that the filtering load is so small that no web movement is required and thus the described timed movement of the web would unnecessarily use up filter medium. When, however, the media saver switch is moved to its closed position upon terminal 73 the timing action is re-established. It will be understood that if the media saver switch 70 is employed the circuits to the timer 41 will be open while a new roll of media is being installed and while motor 21 is being operated under the influence of manual switch 65.

A further supplementary control feature includes an overload pressure switch 75 under the influence of another pressure responsive device 76 and which is normally open until the pressure at a selected region in the filtering zone attains a predetermined value indicating that movement of the web is required even though the timer cycle has not yet run its course. When this occurs switch 75 is moved into contact with terminal 77 and an emergency circuit is made from line 36, conductor 78, switch 75, conductor 79, relay coil 51, and return line 35. Under this condition, timer 41 will be overridden and may operate the second switch 44 several times before the overload condition is corrected and before switch 75 returns to its normally open position at which time the timer once more takes control of the circuits.

Accordingly, it will be noted that our improved control system is flexible in its functioning and despite its simplicity and relatively inexpensive nature is adapted both for long periods of normal operation and for short periods of emergency operation without unnecessary expenditure of filter medium. Having thus described the invention and its attendant advantages, it is intended that the appended claims are to cover such changes and modifications of that invention as come within the true spirit and scope of the same.

What we claim is:

1. In a control apparatus for advancing a web of filter medium in an air filter having a rewind roll for storing the spent web fed through the filtering zone and a motor for driving said roll; the improvement comprising, a self-resetting timer having a timer motor, a switch-operating means actuated in dependence upon the linear advance of said web, a first switch actuated by said means and movable between a normal first position establishing a timer motor circuit and a second position establishing a circuit to said roll-driving motor and simultaneously interrupting the timer motor circuit, said first switch serving to conduct current when occupying each of its respective first and second positions, and a second switch actuated by said timer and movable between a first position establishing a starting circuit to said roll-driving motor and a normal second position interrupting said starting circuit, said first switch being arranged to occupy sequentially its first position corresponding to a condition of rest of said web while said second switch is occupying its respective second position prior to establishing said starting circuit, then to move to and occupy its second position corresponding to a condition of advancing movement of said web after said second switch has moved to its respective second position to establish said starting circuit, and then to return to its first position while said second switch is again occupying its respective second position, said timer upon interruption of its motor circuit automatically resetting itself for the next cycle of web advance and returning said second switch to its second position.

2. In a control system for advancing a web of filter medium in an air filter having a rewind roll for storing the spent web fed through a filtering zone and a motor for driving said roll; the improvement comprising, a self-resetting timer having a timer motor, said timer being adjustable to provide a selected timing cycle without requiring adjustment of the remainder of the control system, a switch-operating means actuated in dependence upon the linear advance of said web, a first switch actuated by said means and movable between a normal first position establishing a timer motor circuit during the running of the selected timer cycle and a second position establishing a circuit to said roll-driving motor at the conclusion of the running of the selected timer cycle and simultaneously interrupting the timer motor circuit, said first switch serving to conduct current when occupying each of its respective first and second positions, and a second switch actuated by said timer and movable between a first position establishing a starting circuit to said roll-driving motor and a normal second position interrupting said starting circuit, said first switch being arranged to occupy sequentially its first position corresponding to a condition of rest of said web while said second switch is occupying its respective second position prior to establishing said starting circuit, then to move to an occupy its second position corresponding to a condition of advancing movement of said web after said second switch has moved to its respective second position to establish said starting circuit, and then to return to its first position while said second switch is again occupying its respective second position, said timer upon interruption of its motor circuit automatically resetting itself for the next cycle of web advance and returning said second switch to its second position.

3. In a central system for advancing a web of filter medium in an air filter having a rewind roll for storing the spent web fed through a filtering zone and a motor for driving said roll; the improvement comprising, a self-resetting timer having a timer motor, a switch-operating means actuated in dependence upon the linear advance of said web, a first switch actuated by said means and movable between a normal first position establishing a timer motor circuit and a second position establishing a circuit to said roll-driving motor and simultaneously interrupting the timer motor circuit, said first switch serving to conduct current when occupying each of its respective first and second positions, said switch-operating means returning said first switch to its first position at the conclusion of advancement of a uniform linear increment of web to said rewind roll, and a second switch actuated by said timer and movable between a first position establishing a starting circuit to said roll-driving motor and a normal second position interrupting said starting circuit, said first switch being arranged to occupy sequentially its first position corresponding to a condition of rest of said web while said second switch is occupying its respective second position prior to establishing said starting circuit, then to move to and occupy its second position corresponding to a condition of advancing movement of said web after said second switch has moved to its respective second position to establish said starting circuit, and then to return to its first position while said second switch is again occupying its respective second position, said timer upon interruption of its motor circuit automatically resetting itself for the next cycle of web advance and returning said second switch to its second position.

4. Apparatus as defined in claim 3 wherein said switch-operating means is rotatable and includes a cam serving to actuate said first switch periodically, each of the intervals betwen successive actuations of said first switch corresponding to uniform linear increments of advance of said web.

5. Apparatus as defined in claim 4 wherein said switch-operating means is in contact with the web and is driven thereby.

References Cited by the Examiner
UNITED STATES PATENTS

| | | | |
|---|---|---|---|
| 2,496,574 | 2/50 | Boger | 318—443 |
| 2,848,064 | 8/58 | Gregory et al. | 55—271 |
| 3,020,976 | 2/62 | Hyatt | 55—271 |
| 3,102,014 | 8/63 | Aitkenhead | 55—271 |

MERVIN STEIN, *Primary Examiner.*